United States Patent Office 2,766,176
Patented Oct. 9, 1956

2,766,176

PROCESS FOR CULTURING ANAEROBIC BACTERIA

George A. Jeffreys, Salem, Va.

No Drawing. Application February 11, 1953,
Serial No. 336,446

11 Claims. (Cl. 195—96)

This invention relates to a new process for culturing obligate anaerobic bacteria in combination with an aerobic microorganism in the presence of air.

This application is a continuation-in-part of application Serial Number 126,437, filed November 9, 1949.

It is well known that many anaerobic bacteria produce growth promoting substances, B-complex vitamins, antibiotics and enzymes of economic and industrial importance in many spheres of activity. Such beneficial factors are produced by anaerobic bacteria in the rumen of herbivorous animals, in cow manure, in hen feces, in the soil, etc. This has been demonstrated by a number of research workers such as Ruben and Bird, Poultry Science, vol. XXVI, No. 5, 439; Ruben, Bird and Rothchild, Poultry Science, vol. XXV, No. 5, 526; McElroy and Goss, Journal of Nutrition, vol. 20, 527, 541; Hodge, Hanson and Allgeier, Industrial and Engineering Chemistry, vol. 44, No. 1, 132–35. Not only are the beneficial substances produced by the anaerobic organisms important but frequently, it is desirable to have available preserved cultures of high viable bacterial count.

The culturing of obligate anaerobic bacteria particularly and semi-anaerobic bacteria to a somewhat lesser extent, even on a laboratory scale poses serious problems. On a commercial scale, the cost is almost prohibitive. Obligate anaerobic bacteria must be grown out of contact with oxygen. The process most commonly employed both in the laboratory and commercially is the submerged liquid method where the organisms are grown in a broth in sealed tanks under anaerobic conditions. Great care must be exercised to maintain sterile conditions since the accidental admission of contaminating microorganisms generally destroys the broth culture in as much as the contaminant usually becomes predominant. Aside from the great skill and care required, operations on a commercial scale are very costly since they require large, expensive tanks and accessory equipment for sterilizing and maintaining anaerboic and sterile conditions.

Various methods for producing and maintaining anaerobic conditions have been proposed, the one most generally in use being replacement of air with an inert gas such as carbon dioxide or nitrogen. Other suggested methods, which can be used only on a laboratory scale, include the use of a reducing chemical which combines with, and thereby removes, the oxygen in the air and introduction into the sealed propagating vessel of an isolated culture of aerobic organisms which remove the oxygen to produce the desired anaerobic conditions and which, after using up the available oxygen in the closed vessel, die off or otherwise become dormant and inactive.

Although semi-anaerobic bacteria will grow to some extent under aerobic conditions, the rate of growth is very slow and for the production of desired factors such as enzymes, vitamins, etc., in any appreciable amounts, they must be grown anaerobically. It will be understood that while my process is particularly directed to the culturing of obligate anaerobes, it is also effective for propagating semi-anaerobes.

Aside from the technical difficulties experienced in propagating obligate anaerobic bacteria, it has hitherto been impossible to produce highly concentrated cultures. The bacterial concentration is generally in the order of several million per ml. or gm. and in rare instances may be as high as about 100 million per gram. Obviously the higher the rate of growth, the larger are the amounts of desirable factors produced and the more potent are the cultures produced for inoculation, feeding or other purposes.

Another difficulty hitherto has been the necessity for preserving the obligate anaerobic cultures under anaerobic conditions. This has generally been accomplished by the lyophile process which involves placing the bacteria dispersed on agar or in serum in glass vials, quickly freezing by immersing the vials in a freezing solution at —20° to —40° C., desiccating under high vacuum and sealing under vacuum. This method is inordinately expensive and, because of its limiting factors, precludes its use for large scale production.

The object of this invention is to provide a process for culturing obligate anaerobic bacteria in synergistic relationship with active aerobic microorganisms in the presence of air.

Another object is to provide a process for culturing obligate anaerobic bacteria which does not require special or costly procedures for producing and maintaining sterile and anaerobic conditions and which, in fact, may be cultured conveniently and economically in ordinary incubators on a large, commercial scale.

Another object is to provide a desiccated viable culture of obligate anaerobic bacteria in admixture with active aerobic microorganisms in which the viable anaerobes are present in considerably higher concentrations than has hitherto been generally obtained.

Another object is to provide cultures of obligate anaerobic bacteria and active aerobic microorganisms which can be desiccated and preserved in the presence of air by ordinary convenient methods without appreciable loss of viability for a long period of time.

Another object is to provide a preserved viable bacterial product containing high concentrations of desirable factors such as B-complex vitamins, growth factors, antibiotics, enzymes and the like for use in fortifying livestock feeds and enriching food products for human consumption.

Still another object is to provide preserved cultures containing viable aerobic and obligate anaerobic microorganisms for digesting materials such as sewage and other industrial wastes, for soil inoculation and for the production of soil conditioners and fertilizers such as composts.

Other objects and advantages will become obvious from the following detailed description.

In general my process comprises the culture of anaerobic bacteria in intimate relationship with active obligate aerobic vegetative microorganisms such as bacteria and molds on a nutrient substrate in the presence of air. The actively growing aerobes provide the requisite anaerobic conditions for the growth and propagation of the anaerobic organisms. The relationship between the anaerobic and aerobic organisms is synergistic and in the case of the molds is symbiotic as well with consequent unexpectedly high rate of growth and proliferation of the anaerobes and markedly high production of desired associated factors. The culture may be preserved by desiccating by ordinary methods in the presence of air to produce a dry product containing a high concentration of viable microorganisms, both anaerobic and aerobic, and associated, desired factors, such as B-complex vitamins, growth stimulating substances, antibiotics, enzymes and the like.

The culture medium employed in my invention is preferably a granular substrate composed of wheat bran or similar grain coating or vegetative fibrous material such as straw, hay or hulls of grain. To this is added other essential nutrients such as proteinaceous materials or other nitrogenous equivalents, carbohydrates, trace minerals and inorganic salts.

The composition of the culture medium is not critical, it being essential only to introduce the necessary food elements preferably in amounts for optimum growth. To some extent the composition will, of course, be varied depending upon the particular organisms being propagated and other factors. In general a highly satisfactory formulation comprises about 60% to 85% of wheat bran or other vegetative, fibrous material, preferably cut up or ground to the same particle size as bran. A source of carbohydrate such as starch, dextrose or the like may be incorporated in a quantity preferably between about 5 to 20% depending on the amount available in the particular fibrous material employed. The proteinaceous material is desirably introduced in amounts between about 2 to 15% and may comprise any suitable source such as vegetable protein meals as, for example, soy bean meal, or animal proteins as, for example, fishmeal, livermeal, meat meal, milk and the like. Equivalent, assimilable non-proteinaceous nitrogenous materials, such as urea or ammonium salts as, for example, ammonium sulfate and ammonium phosphate, may be used in place of, but preferably to supplement the proteinaceous nutrient.

Small amounts of trace minerals such as cobalt, iodine, copper and manganese are also desirable both to facilitate growth of the organisms and to increase the production of vitamin $B_{12}$ and other growth factors. If the fibrous component is low in potassium content, it may be supplemented by the addition of mono- and dibasic potassium salts, for example in amounts of about 0.25 to 0.5%.

Although not essential, it is desirable in some cases to incorporate organic nutrients or chemicals that reduce the oxidation/reduction potential to a minus condition. Examples of such organic materials are tomato juice, grasses and legumes or their juices, milk or milk products, ascorbic acid, sodium thioglycollate, sodium bisulfide, or any vegetable or compatible chemical that has a tendency to produce a minus oxidation/reduction potential. These reducing materials may be added either to the nutrient substrate or to the inoculating liquid or to both. Solid additives are preferably incorporated into the solid substrate.

Water is added to the mixture of solid nutrients and substrate, desirably in amount comprising about 25% to 75% by weight. The mixture is acidified to a pH of about 3.5 to 4.5 by the addition of HCl or other suitable acid. The acidifying material is conveniently added to the water prior to inclusion into the solid components. Acidity of the nutrient medium within this range of pH is desirable for more effective sterilization.

The mixture is cooked and sterilized, as for example, with steam at temperatures preferably in the range of about 180° to 252° F. The particular temperature employed is determined by the type of cooking equipment employed, the length of heating time and the quantity of material. In general, only a few minutes are required at the higher temperatures and up to about 30 minutes at the lower temperatures within this range.

After sterilization, the nutrient medium is neutralized to a pH of about 6.0 to 7.0, preferably about 6.5, with any suitable alkali such as lime or calcium carbonate.

The obligate anaerobic bacteria may be obtained from any desired source depending, of course, on the particular use to which the culture is to be put and the associated factors desired. For example, where high concentrations of B-complex vitamins, growth promoting substances, digestive enzymes and antibiotics are desired, the organisms present in the rumen of a ruminant, hen feces, cow manure and in certain soils are particularly suitable.

The use of rumen organisms is particularly desirable where the product is to be employed as a livestock feed supplement not only because of the large quantities of beneficial factors produced but also because it provides highly potent concentrations of rumen organisms for seeding and fortifying the rumen of ruminant livestock.

Where the product is to be used for the digestion of organic matter as, for example, in the treatment of sewage, the organisms may be taken from septic tanks, trickling filters, activated sludge and the like. For soil conditioning, compost formation and the like suitable organisms may be obtained from soil and humus.

Care should be exercised in obtaining the inoculating specimens to avoid contamination. Rumen material, for example, is preferably taken from a healthy steer or cow by means of a stomach pump under aseptic conditions although the rumen contents obtained from freshly slaughtered, inspected animals is also utilizable. Similarly, aseptic conditions should be observed in taking material from other sources such as hen feces, cow manure, soil, etc. Samples from sewage sludge digestors should be taken from beneath the surface of the liquid.

The inoculating solution may be prepared by suspending the material per se containing the desired anaerobes, such as the ground rumen contents, in water in which case all of the different types and varieties of bacteria are given an opportunity to proliferate, or predominant strains of bacteria may be isolated and subcultured in broth according to the usual methods well known to the art. The inoculating suspension or subculture should be kept refrigerated under anaerobic conditions until ready for use. Preferably, it should be used within 48 hours but samples have been kept successfully for as long as a week. As a general rule, aqueous inoculating solutions or suspensions containing from 0.25 to 1% of bacterial material is sufficient for my purpose. As aforementioned, it is frequently helpful to introduce into the inoculating liquid such oxygen reducing materials as tomato juice, juices of legumes and grasses, ascorbic acid, sodium thioglycollate, as for example in amounts of 0.01 to 0.1%, sodium bisulfide, as for example in amounts of 0.001 to 0.01%.

The aerobic vegetative microorganisms may be either molds or bacteria which grow rapidly and require abundant oxygen. The molds may be, for example, beneficial members of Aspergillus, Penicillium, Rhizopus, Mucor, Trichoderma and similar types which include various beneficial yeasts. Molds which produce antibiotic substances, such as Penicillium, Aspergillus and the like are particularly efficacious since they inhibit the development of undesirable organisms.

The mold culture may include spores only or both spores and mycelium.

The aerobic bacteria should not be acid-forming and should be capable of maintaining a minimum pH of about 5.5 and preferably a minimum of about 6.5 and ranging up to an alkaline pH, as for example about 7.5 to 8. Though not essential, it is preferable to employ bacterial strains and species which are also able to produce B vitamins and antibiotic substances since, aside from the fact that this serves to increase the concentration of these desired factors, the antibiotic substances help to inhibit the growth of undesirable types of organisms in the substrate and to encourage the growth of those organisms which produce growth-promoting factors.

Any beneficial aerobic bacteria which fulfill the aforedescribed conditions may be employed for my purpose. Particularly suitable are members of the genus Bacillus, family Bacillaceae. The most desirable species, for example are various strains of *B. subtilis* such as *B. licheniformis* which produces bacitracin, *B. mesentericus*, *B. megatherium* or any beneficial species of this type which produces B vitamins, antibiotic substances or enzymes.

The amount of mold or aerobic bacteria culture used may vary and, in general, about 0.25% to 2% based on the bran substrate is adequate. The culture can be added directly to the fibrous substrate or it can be introduced into the water suspension of the anaerobic bacteria or both methods can be used.

The inoculating suspension or culture containing the anaerobic organisms is introduced into the sterilized granular nutrient substrate preferably at a temperature of about 90° F. to 100° F. The mixing is preferably done under limited aerobic conditions or under an inert gas. A sufficient amount of inoculum is added to make a moist mixture, as for example, one containing about 70 to 125 parts of water per 100 parts of substrate solids.

The inoculated culture medium is spread on trays to form a layer about 1 to 2 inches thick and then placed in suitable incubators where temperature and humidity may be controlled with standard equipment. The temperature of the substrate should be maintained at a level which stimulates active growth. In general, a range of about 82° to 105° is optimum and, in most cases, it is well not to permit the temperature to rise much above the maximum figure. Humidity should be maintained at a high level, preferably at about 80 to 90 percent relative humidity.

At the start of incubation only sufficient air is admitted to supply the requirements of the aerobic microorganisms present. The amount of air introduced should be increased to supply the increased requirements of the growing and proliferating aerobic organisms. The limited aerobic conditions may be readily controlled, as for example, by regulating air intake by diluting the air with an inert gas, such as nitrogen or $CO_2$, in adjusted amounts to provide for optimum growth of both the aerobic and anaerobic organisms.

Within a period generally of about 2 to 6 hours the aerobic mold or bacteria begin to grow actively and in so doing produce an oxidation-reduction potential on the negative side which is conducive to the growth of the anaerobic bacteria. This is accomplished by virtue of the fact that the aerobic organisms absorb oxygen and excrete $CO_2$ and other gases which, in effect, produces an anaerobic environment in the vicinity of the anaerobes. The physical growth and proliferation of the aerobes develop a protective solid mat, as, for example, the mold mycelium, around the anaerobes which further serves to exclude air.

After active growth and development of the aerobic organisms have become well established, it is generally no longer necessary to limit air intake into the incubating chamber, although this may be continued to some extent so long as it serves to provide optimum conditions for active propagation of the anaerobes. It should be understood that to maintain the necessary active growth of the aerobic organisms, an adequate supply of oxygen must be provided.

The active growth and respiration processes of the organisms generate heat and to keep the temperature from becoming excessive, it frequently becomes necessary to remove surplus heat. This may be accomplished by cutting off the external heating mechanism and increasing the movement of air over the outer surface of the material.

Maximum growth generally is attained in about 24 to 36 hours. The culture may now be broken up and dried by subjecting it to moderately hot dry air according to conventional desiccating methods. If it is desired to keep the organisms viable, the temperature of the drying air should be regulated so that the temperature of the culture itself does not exceed the thermal death point of the microorganisms. In most cases the temperature of the culture should not be permitted to rise above about 107° F. Drying temperatures may be higher if the only requirement is to obtain the beneficial factors produced by the organisms during culturing. As drying proceeds, the anaerobic bacteria are protected by the enveloping fibrous substrate and the aerobic microorganisms. It is also believed that various end products produced in the culture act as buffering and reducing agents to provide an oxidation-reduction potential on the negative side which helps preserve the anaerobic bacteria. It will be understood, of course, that any other suitable method for desiccating the bacteria may also be employed.

The desiccated cultures obtained as aforedescribed generally contain at least 2 billion viable obligate anaerobes per ml. or gram. The anaerobic bacterial count is usually in the neighborhood of about 3 to 10 billion and in many instances is as high as 30 to 40 billion. The aerobic mold or bacteria count in the preserved cultures is proportionately high, generally being in the neighborhood of 1 or more billion. The desiccated cultures, furthermore, remain viable for an indefinite period of time.

It is obvious from the amazingly high obligate anaerobic bacterial counts obtained that the active aerobic organisms provide an entirely adequate anaerobic environment. However, this in itself does not completely explain the remarkable growth of the anaerobic bacteria. There is a synergistic relationship between the two types of organisms which results in an acceleration both of growth and the production of beneficial substances such as B-complex vitamins, antibiotics, growth promoting factors, enzymes and the like. These beneficial substances are developed in considerably higher amounts than would normally be obtained from the organisms grown separately. There is also, apparently, a symbiotic relationship between the anaerobic bacteria and molds when the latter are employed as the aerobic organisms.

The synergistic effect is at least partially explained by digestion of the substrate nutrients by each type of organism to form products which are more readily assimilated by the other type of organism and by the secretion of beneficial associated factors which either directly or indirectly stimulate growth of the other organisms.

EXAMPLE I

A substrate composed of the following ingredients was prepared:

950 lbs. wheat bran
5 lbs. dry brewer's yeast
12 lbs. soybean oil meal
15 lbs. whey
2½ lbs. mono calcium phosphate
½ lb. trace mineral mixture
500 lbs. water
2500 mls. commercial HCl The above ingredients were mixed and then steamed in an open mixer to a temperature of 200° F. and held at this temperature fifteen minues.

The mixture was cooled to 160° F. at which time a mixture of equal parts of lime and calcium carbonate were added in sufficient amounts to raise the pH to 6.5. The culture medium was then cooled to about 100° F. and inoculated with 200 lbs. of inoculating water prepared as follows:

Into a sterile kettle was added the following:

250 lbs. warm clean water
5 lbs. mold culture of *Aspergillus oryzae*
1 lb. rumen contents obtained under aseptic conditions The mass was mixed for not more than 1½ minutes under limited aerobic conditions and then immediately spread on trays in a layer about 1¼ inches deep and placed in a warm humid incubator of conventional type. The temperature of the material was maintained at 86° F. by live steam for a period of 20 hours. Until the 8th hour the air entering the incubator was diluted with $CO_2$, the amount of the latter being gradually reduced as the mold increased in growth and activity. At the 8th hour the agitation of the air was increased and the temperature of the air so regulated that overheating did not take place. After the 20th hour, the live steam was cut off and dry heat substituted. However, after the 14th hour, little heat was required due to the heat generated by the culture. After the 24th hour, the culture reached its zenith and at the 28th hour, the culture was broken up and drying instituted. Desiccation was accomplished by circulating hot, dry air over the surface of the material. The temperature of the culture while drying was not allowed to exceed 105° F. Drying was complete at 20 hours. The dried and preserved culture gave a viable obligate anaerobic bacteria count of 3½ billion per gram.

EXAMPLE II

A nutrient, fibrous substrate was prepared and processed as disclosed in Example I. 5 lbs. of a mold culture of *Aspergillus oryzae* was employed as the aerobic organism. The anaerobic organisms were contained in a sample taken directly from a sewage sludge digestor, the percentage used being 0.5% of the inoculating water.

Except that the temperature of incubation was maintained at about 82° F. or slightly lower than for rumen bacteria, an incubation procedure was employed as in Example I. At the end of the incubation period of 30 hours, the material was dried by the circulation of hot dry air over it at a temperature which did not permit the temperature of the culture to exceed 95° F. The preserved culture gave an obligate anaerobic bacteria count of 3 billion per gram after storage for one month. The enzyme activity of this material when tested on casein and starch was very good.

EXAMPLE III

A nutrient substrate was prepared and processed as in Example I except that the mixture after steaming was neutralized to pH 7.0. The culture medium was then inoculated with a suspension prepared as follows:

300 lbs. warm clean water
10 lbs. 24 hour broth culture *B. licheniformis*
2 lbs. tomato juice
13 grams sodium bisulfide
1 lb. suspension of hen feces The mass was thoroughly and quickly mixed, then spread on trays in a layer about 1½ inches deep and placed in the incubator. The temperature of the material was maintained at 86° F. by live steam for a period of 18 hours. Limited aerobic conditions were maintained until about the 8th hour, when the agitation of the air was increased and the temperature of the air so regulated that overheating did not take place. After the 18th hour, the live steam was cut off and the heat produced by growth of the culture utilized. After the 22nd hour, the culture reached its zenith and at the 28th hour the culture was broken up and drying instituted by circulation of hot dry air at a temperature regulated to maintain a maximum of 107° F. in the culture material. Drying was complete at 20 hours. The dried culture showed an anaerobic bacteria count of 16 billion per gram.

EXAMPLE IV

A culture particularly adapted to the treatment of sewage was made as follows:

A nutrient substrate composed of the following ingredients was prepared:

700 lbs. rice hulls
200 lbs. wheat bran
5 lbs. dried brewer's yeast
20 lbs. soybean meal
20 lbs. alfalfa meal
25 lbs. dextrose
3 lbs. monocalcium phosphate
½ lb. trace mineral mixture
500 lbs. water
2500 lbs. commercial HCl The substrate was prepared and processed as in Example I, except that the mixture after steaming was neutralized to pH 7.0. The mixture was cooled to 100° F. and inoculated with 300 lbs. of inoculating suspension prepared as follows:

300 lbs. warm clean water
10 lbs. of wash water containing washings and scrapings of trickling filter
3 lbs. tomato juice
1 lb. sludge from bottom of trickling filter The mass was thoroughly and quickly mixed, then spread on trays in a layer about 1½ inches deep and placed in the incubator. The temperature of the material was maintained at 86° F. by live steam for a period of 18 hours. The air admitted to the incubator was diluted with $CO_2$ until about the 8th hour, when the agitation of the air was increased and the temperature of the air so regulated that overheating did not take place. After the 18th hour, the live steam was cut off and the heat produced by the actively growing culture utilized. After the 22nd hour, the culture reached its zenith and at the 28th hour the culture was broken up and drying instituted by means of hot, circulating air at a temperature controlled to maintain the culture at a maximum of about 107° F. Drying was complete at 20 hours. After drying, the aerobic bacteria was 2 billion and the obligate anaerobic count was 5 billion.

EXAMPLE V

A culture particularly adapted for the treatment and conditioning of soil was made as follows:

A nutrient substrate composed of the following ingredients was prepared:

900 lbs. ground rice hulls
65 lbs wheat bran
25 lbs. molasses
5 lbs. monocalcium phosphate
2 lbs. potassium nitrate
3 lbs. ammonium sulfate
½ lb. trace minerals
800 lbs. water The mixture was adjusted to pH 6.2 with HCl without steaming or sterilizing, and then inoculated with 300 lbs. of the following suspension prepared as follows:

300 lbs. clean warm water
5 lbs. of dry fungi growth containing spores of Aspergillus, Mucor, Rhizopus, Trichoderma and Penicillium
1 lb. soil containing anaerobic bacteria in rich humus.

The culture was mixed and spread on trays in a layer about 3 inches deep and allowed to incubate for 3 days under initially restricted and subsequently increased aerobic conditions as described in the preceding examples.

The black mat which formed throughout the material was broken up, moistened with 25 parts of water and neutralized with lime to pH 7. It was again inoculated with neutral soil containing soil nitrogen-fixing bacteria such as Rhizobium, Radiobacter, Azotobacter, Aerobactor and other heterotrophic bacteria together with various types of autotrophic microorganisms.

The mixture was incubated for 2 days. At the end of this time, it assumed a dark brown granular character with a pleasant, earthy odor. The mixture was then dried by means of hot air regulated so that the temperature of the culture did not exceed 100° F. A viable bacteria count showed 6 billion obligate anaerobic bacteria per gram and 3½ billion aerobic bacteria per gram.

EXAMPLE VI

A culture particularly adapted for the digestion of petroleum waste products was made as follows:

The procedure was similar to that in Example II except that the anaerobic inoculum was secured from a digestor which was digesting sludge from petroleum waste products. To favor the development of the petroleum bacteria, crude petroleum in an amount of about 0.05% was added to the substrate. The final culture contained about 6 billion anaerobic bacteria per gram.

The cultures produced according to my process may be utilized in many ways.

Because of the extremely high viable bacterial concentration, the cultures are particularly suitable for seeding or mass inoculation in commercial biological processes designed to produce desired associated factors such as B-complex vitamins, beneficial enzymes, growth-promoting factors, antibiotics and the like. It is an established fact that, in many cases, a few bacteria when introduced into a specific medium will not produce the desired result. However, when large concentrations are used, they produce considerably larger amounts of the desired factor than would normally be expected on the basis of the number of bacteria present. For example, Churchman and Kohn (Journal of Experimental Medicine, 1921, 33, 583) showed that although a single cell would not grow in the presence of gentian violet, thirty cells could initiate growth and accomplish much more than thirty times what one cell could accomplish.

Preserved, viable rumen cultures are especially valuable in the feeding of livestock, particularly of the ruminant varieties, since it serves to introduce into the rumen desirable rumen organisms in sufficiently large numbers effectively to establish or to supplement rumen activity at an optimum level for the well-being of the animal.

Where suitable anaerobic organisms are cultured according to my process, as, for example, organisms obtained from rumen contents, hen feces, cow manure and the like, considerable amounts of desirable associated factors, including B-complex vitamins, enzymes, unidentified growth-promoting factors, antibiotics and the like, are produced and preserved in concentrated form in the desiccated cultures so that the preserved cultures are particularly advantageous for use as supplements both for livestock feeding and human consumption. The B-complex vitamins produced in the cultures include $B_{12}$, riboflavin, niacin, pantothenic acid and choline. Furthermore the ingested viable organisms themselves produce the desired factors in vivo.

Example VII clearly illustrates the large amounts of unidentified growth-promoting factors obtainable by the use of such cultures. The growth response in chicks, for example, is comparable to or even higher than that obtained with other rich sources such as fish solubles and fishmeal.

EXAMPLE VII

Tests were made to determine the growth response due to unidentified growth factors obtained by the use of the cultures prepared according to Examples I and III and also cultures of *Aspergillus oryzae* and anaerobic organisms obtained from hen feces and cow manure.

The standard test procedure and basal ration employed were those recommended by the Wisconsin Alumni Research Foundation whereby the growth factors are determined by the added growth obtained when the test material is fed to chicks in addition to a balanced ration containing all the known vitamins.

*Growth response of chicks* [1]

| | Wt. in grams at 4 weeks | Wt. in grams at 6 weeks |
|---|---|---|
| 1. Basal ration plus 3% fish solubles and 2% fishmeal | 236 | 706.7 |
| 2. Basal plus 2% mold culture with hen feces | 262 | 706.5 |
| 3. Basal plus 2% mold culture with cow manure | 272 | 702.7 |
| 4. Basal plus 2% mold culture with rumen | 284 | 714.8 |
| 5. Basal plus 2% culture *B. licheniformis* with cow manure | 284 | 714.8 |
| 6. Basal—no additions—Control | 255 | 696.3 |

[1] New Hampshire chicks—17 to the group.

Cultures may be prepared according to my process which are especially valuable for the digestion of organic materials. These may be applied in many spheres of industrial activity and are particularly effective in the treatment of sewage and other industrial wastes such as petroleum wastes. The cultures may be tailored according to the particular use by proper selection of organisms.

The cultures employed in sewage disposal are effective both in aerobic phases of treatment as, for example, in the aerated, activated sludge or trickling filter processes and in anaerobic phases such as septic tank or sludge digestion. In the former case the aerobic bacteria in the culture become active and in the latter case the anaerobes carry out the digestion processes. The large concentrations of enzymes present in the seeding culture are also very important since they accelerate considerably the digestion processes. High concentrations of selected bacteria in the seeding culture are particularly important in sewage digestion in order to provide for vigorous growth of the desirable organisms since, otherwise, there is a marked tendency for the digesting organisms to be choked out by proliferation of undesirable contaminants or destroyed by end products of such organisms.

EXAMPLE VIII

A dried culture prepared as in Example II was employed in an effort to improve sewage digestion conditions in a sewage treatment plant in Houston, Texas. The sludge digester was a reinforced concrete tank with a circular fixed cover and a hopper bottom and had a capacity of 1200 cubic feet. For a two week period prior to use of the culture, the BOD averaged 1782 p. p. m., suspended solids averaged 1908 p. p. m. and pH averaged 5.9.

The culture was added to the contents of the digester first in a 10 lb. batch and for two weeks thereafter was added daily in 2 lb. quantities. The dosage was increased to 4 lbs. daily for 12 days and then raised to 5 lbs. daily for two more weeks after which time it was discontinued. The BOD dropped to an average of 719 p. p. m. and suspended solids to 328 p. p. m. The pH rose to 6.5. Conditions continued to improve for 3 weeks after cessation of treatment and improved conditions were still in effect 60 days after addition of the culture was discontinued. It was also noted that the quantity of sludge available for drawing dropped to less than 50% of the previous level.

EXAMPLE IX

The culture prepared according to Example IV was mixed with equal parts of the dried culture prepared according to Example II. This was introduced into a sludge lagoon of a plant in Texas that had a partially decomposed digester sludge. Within 12 hours after application of the culture, the lagoon became very active as indicated by a number of gas bubbles emerging at the surface. All floating sludge sank to the bottom of the lagoon and within three days a layer of green algae covered the entire lagoon with no odor being observed in the vicinity. The activity of the lagoon was then continuously maintained by the addition of two pounds of the mixed culture into the wet well of the plant between the pumpings of sludge to the lagoon.

EXAMPLE X

A dried culture prepared according to Example V was tested for its soil enriching and conditioning properties as follows:

A clay soil of low humus content was sifted and thoroughly mixed with blue grass and clover seeds. The soil and seed mixture was then divided into 50 gram portions. The culture in varying concentrations was added to several of the soil samples. Synthetic soil conditioners were added to several other portions and one portion was retained as a control with no additions.

Each soil portion was placed in a cup 3 inches in diameter and having a perforated bottom. Equal amounts of water were added daily to each of the petri dishes in which the cups had been placed. At the end of 10 days, the control and each of the soil samples containing the synthetic conditioners had begun to dry out and crack. The portion containing as little as 0.1% of culture retained more moisture and portions containing 0.4% showed maximum growth of grass and clover and no cracking.

Although this invention has been described with reference to illustrative embodiments thereof, it will be apparent to those skilled in the art that modifications may be made and that the principles of the invention may be embodied in other forms but within the scope of the invention and of the appended claims.

I claim:

1. A process for culturing anaerobic bacteria which comprises admixing obligate anaerobic bacteria with obligate aerobic vegetative microorganisms, the aerobic organisms being characterized by the ability actively to absorb oxygen and to grow rapidly, and incubating the mixture of organisms on a nutrient substrate in the presence of air, said air being present throughout the incubating period to provide for the growth of the aerobic organisms.

2. A process for culturing anaerobic bacteria which comprises admixing obligate anaerobic bacteria with aerobic mold, the mold being characterized by the ability actively to absorb oxygen and to grow rapidly, and incubating the mixture of organisms on a nutrient substrate in the presence of air, the amount of air in the incubating chamber being initially limited and being increased as the aerobic organisms increase in growth.

3. A process for culturing anaerobic bacteria which comprises admixing obligate anaerobic bacteria with obligate aerobic bacteria, the aerobic bacteria being characterized by the ability actively to absorb oxygen and to grow rapidly, and incubating the mixture of organisms on a nutrient substrate in the presence of air, the amount of air in the incubating chamber being initially limited and being increased as the aerobic organisms increase in growth.

4. A process for culturing and preserving anaerobic bacteria which comprises admixing obligate anaerobic bacteria with obligate aerobic bacteria, the aerobic bacteria being characterized by the ability actively to absorb oxygen, to grow rapidly and to maintain a minimum pH of about 5.5, and incubating the mixture of organisms on a granular nutrient substrate in the presence of air, the amount of air in the incubating chamber being initially limited and being increased as the aerobic organisms increase in growth, and then drying the culture by circulating hot dry air at a temperature controlled to maintain the temperature of the culture below the thermal death point of the microorganisms to form a desiccated culture containing viable aerobic and obligate anaerobic bacteria.

5. A process for culturing and preserving anaerobic bacteria which comprises admixing obligate anaerobic bacteria with aerobic mold, the mold being characterized by the ability actively to absorb oxygen and to grow rapidly, and incubating the mixture of organisms on a granular nutrient substrate in the presence of air, the amount of air in the incubating chamber being initially limited and being increased as the aerobic organisms increase in growth, and then drying the culture by circulating hot, dry air at a temperature controlled to maintain the temperature of the culture below the thermal death point of the microorganisms to form a desiccated culture containing viable aerobic and obligate anaerobic microorganisms.

6. A process for culturing and preserving anaerobic bacteria, which comprises admixing obligate anaerobic bacteria with obligate aerobic bacteria, the aerobic bacteria being characterized by the ability actively to absorb oxygen, to grow rapidly and to maintain a pH of about 6.5 to alkaline, incubating the mixture of organisms on a granular nutrient substrate in the presence of air, the amount of air in the incubating chamber being initially limited and being increased as the aerobic organisms increase in growth, at a temperature such that the temperature of the culture does not exceed a maximum of about 105° F., and then drying the culture by circulating hot dry air at a temperature controlled to maintain the temperature of the culture at a maximum of about 107° F. to form a desiccated culture containing viable aerobic and obligate anaerobic bacteria.

7. A process for culturing and preserving anaerobic bacteria which comprises admixing obligate anaerobic bacteria with mold selected from the group consisting of Aspergillus, Penicillium, Rhyzopus, Trichoderma and Mucor, incubating the mixture of organisms on a nutrient substrate having a pH in the range of about 6.0 to 7.0 in the presence of air, the amount of air in the incubating chamber being initially limited and being increased as the aerobic organisms increase in growth, at a temperature such that the temperature of the culture does not exceed a maximum of about 105° F., and then drying the culture by circulating hot, dry air at a temperature controlled to maintain the temperature of the culture at a maximum of about 107° F. to form a desiccated culture containing viable aerobic and obligate anaerobic microorganisms.

8. A process for culturing and preserving anaerobic bacteria which comprises admixing obligate anaerobic bacteria with aerobic bacteria selected from the genus Bacillus, family Bacillaceae, the aerobic bacteria being characterized by the ability actively to absorb oxygen, to grow rapidly and to maintain a pH from about 6.5 to alkaline, incubating the mixture of organisms on a granular nutrient substrate having a pH in the range of about 6.0 to 7.0 in the presence of air, the amount of air in the incubating chamber being initially limited and being increased as the aerobic organisms increase in growth, at a temperature such that the temperature of the culture does not exceed a maximum of about 105° F., and then drying the culture by circulating hot dry air at a temperature controlled to maintain the temperature of the culture at a maximum of about 107° F. to form a desiccated culture containing viable aerobic and obligate anaerobic bacteria.

9. A process for culturing and preserving anaerobic rumen organisms which comprises admixing the organisms obtained from the rumen of a ruminant animal including obligate anaerobic rumen bacteria with aerobic mold, the mold being characterized by the ability actively to absorb oxygen and to grow rapidly, incubating the mixture of organisms on a granular nutrient substrate in the presence of air, the amount of air in the incubating chamber being initially limited and being increased as the aerobic organisms increase in growth, at a temperature such that the temperature of the culture does not exceed a maximum of about 105° F., and then drying the culture by circulating hot dry air at a temperature controlled to maintain the temperature of the culture at a maximum of about 107° F. to form a desiccated culture containing viable obligate anaerobic rumen organisms and aerobic mold.

10. A process for culturing and preserving anaerobic rumen organisms which comprises admixing the organisms obtained from the rumen of a ruminant animal including obligate anaerobic rumen bacteria with *Aspergillis oryzae*, incubating the mixture of organisms on a granular nutrient substrate having a pH in the range of about 6.0 to 7.0 in the presence of air, the amount of air in the incubating chamber being initially limited and being increased as the aerobic organisms increase in growth, at a temperature such that the temperature of the culture does not exceed a maximum of about 105° F., and then drying the culture by circulating hot dry air at a temperature controlled to maintain the temperature of the culture at a maximum of about 107° F., to form a desiccated culture containing viable obligate anaerobic rumen organisms and *Aspergillis oryzae*.

11. A process for culturing and preserving aerobic and anaerobic bacteria suitable for the treatment of sewage, which comprises admixing obligate anaerobic bacteria which are characterized by their ability to digest organic matter with obligate aerobic vegetative microorganisms, the aerobic organisms being characterized by the ability actively to absorb oxygen and to grow rapidly, incubating the mixture of organisms on a granular nutrient substrate in the presence of air, the amount of air in the incubating chamber being initially limited and being increased as the aerobic organisms increase in growth, at a temperature such that the temperature of the culture does not exceed a maximum of about 105° F., and then drying the culture by circulating hot, dry air at a temperature controlled to maintain the temperature of the culture at a maximum of about 107° F. to form a desiccated culture containing viable aerobic obligate anaerobic microorganisms.

References Cited in the file of this patent

UNITED STATES PATENTS

| | | |
|---|---|---|
| 2,440,546 | Jeffreys | Apr. 27, 1948 |
| 2,560,830 | Turner | July 17, 1951 |
| 2,636,823 | De Beeze | Apr. 28, 1953 |

FOREIGN PATENTS

| | | |
|---|---|---|
| 496,632 | Canada | Oct. 6, 1953 |

OTHER REFERENCES

Hoover et al.: Sewage and Industrial Wastes, January 1952, pp. 38–43.